United States Patent [19]

McDonald

[11] 4,406,477
[45] Sep. 27, 1983

[54] COMBINATION BOAT AND AUTOMOBILE TRAILER

[76] Inventor: Lowell R. McDonald, P.O. Box 57, Kechi, Kans. 67067

[21] Appl. No.: 322,936

[22] Filed: Nov. 19, 1981

[51] Int. Cl.³ .............................................. B60P 3/08
[52] U.S. Cl. ................................... 280/414.1; 296/26; 410/14; 410/24
[58] Field of Search .......................... 280/414.1, 414.3; 296/157, 26; 410/14, 17, 24, 25, 26; 405/3

[56] References Cited

U.S. PATENT DOCUMENTS

| | | | |
|---|---|---|---|
| 3,265,024 | 8/1966 | Kramuch | 405/3 |
| 3,276,211 | 10/1966 | Drake | 405/3 |
| 3,870,339 | 3/1975 | Goff | 280/414.1 |
| 3,909,057 | 9/1975 | Gutmry | 280/414.1 |
| 3,989,265 | 11/1976 | Smiley | 280/414.1 |
| 4,068,772 | 1/1978 | Prudhomme | 414/477 |
| 4,188,056 | 2/1980 | Watson | 280/414.1 |
| 4,221,420 | 9/1980 | Vencill et al. | 280/414.1 |

*Primary Examiner*—Joseph F. Peters, Jr.
*Assistant Examiner*—Kenneth R. Rice
*Attorney, Agent, or Firm*—Edwin H. Crabtree

[57] ABSTRACT

A double load trailer adapted for receiving an automobile on a first horizontal frame mounted on a wheeled axle. A second horizontal frame is slidably mounted on a plurality of vertical posts attached to the first frame. The second frame is adapted for receiving a boat thereon. When the automobile has been unloaded from the trailer, the second frame is lowered in a horizontal plane on top of the first frame so the boat can be unloaded from the trailer into the water.

4 Claims, 6 Drawing Figures

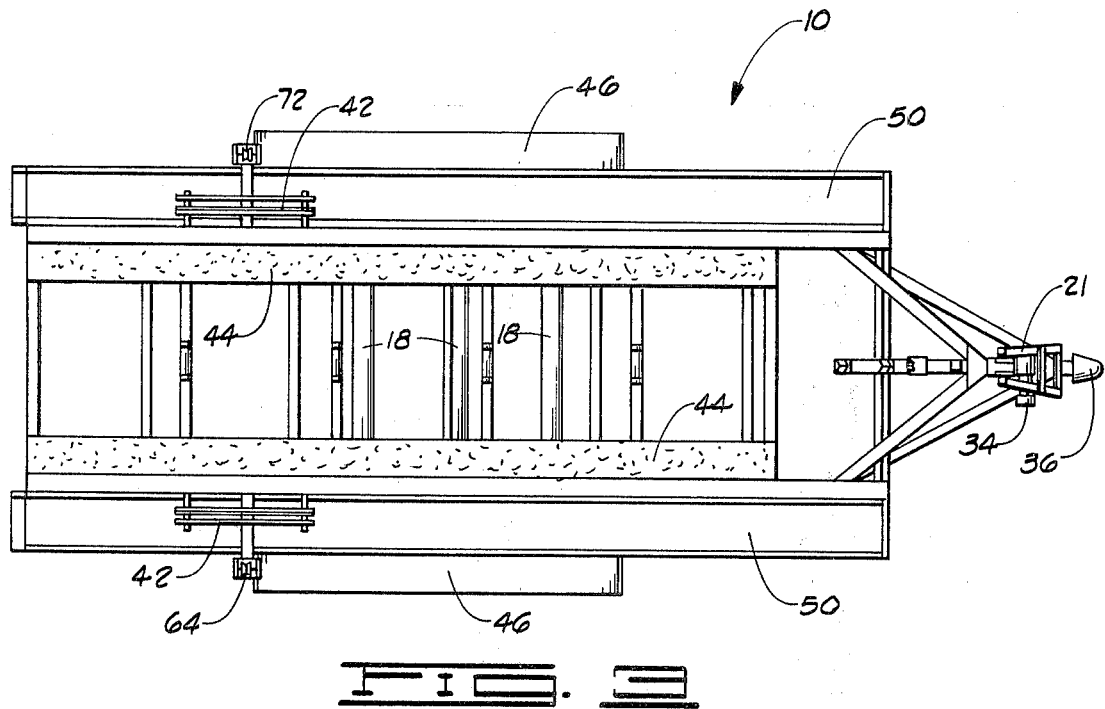
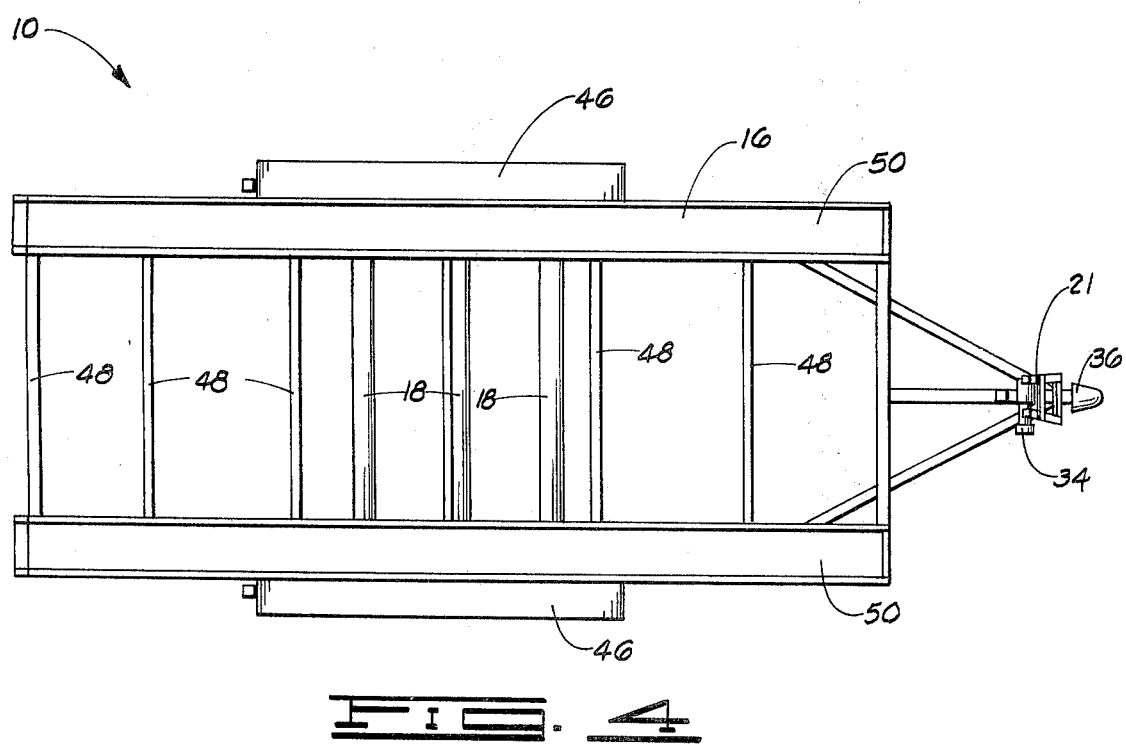

COMBINATION BOAT AND AUTOMOBILE TRAILER

BACKGROUND OF THE INVENTION

This invention relates to a double load trailer having a horizontal frame slidably mounted on top of another horizontal frame for receiving automobiles, boats or the like thereon and more particularly but not by way of limitation to a double load trailer having a first frame mounted on a wheeled axle and adapted for receiving an automobile thereon and a second horizontal frame slidably mounted above the first frame and adapted for receiving a boat thereon.

Heretofore, there have been various types of car and boat trailers, camper and boat trailer combinations and trailers for receiving boats and motorcycles thereon. These different types of trailers are disclosed in U.S. Pat. No. 4,221,420 to Vencill et al, U.S. Pat. No. 4,068,772 to Prudhomme, U.S. Pat. No. 3,989,265 to Smiley, U.S. Pat. No. 3,909,057 to Guthry and U.S. Pat. No. 4,188,056 to Watson.

None of the above mentioned patents describe nor do they teach the unique combination of structure making up the subject double load trailer as described herein.

SUMMARY OF THE INVENTION

The subject invention is unique in design, rugged in construction and is adapted for hauling both an automobile and a boat on a trailer releasably attached behind a towing vehicle. The user of the trailer can quickly unload the automobile from the trailer so the automobile can be attached to the trailer. The automobile can then back the trailer down a boat ramp so the boat can quickly be unloaded into the water. The trailer can then be released from the automobile with the automobile then free for use independent of the towing vehicle.

The combination boat and automobile trailer is operated by a single power winch which may be battery operated or any other power means for raising and lowering the boat frame above the automobile frame.

The combination boat and automobile trailer for hauling both an automobile, a boat or the like behind a towing vehicle includes a first horizontal frame mounted on a wheeled axle and adapted for releasable attachment to the towing vehicle. A first vertical post is mounted on the front of the first frame. A second and third vertical post is mounted on opposite sides of the rear of the first frame. A second horizontal frame is disposed above the first frame and slidably mounted on the first, second and third posts. A power winch having a plurality of cables received around pulleys is attached to the first frame, the second frame and the posts for raising and lowering the second frame on the posts in a horizontal plane above the first frame.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 3 is a top view of the trailer.

FIG. 4 is a top view of the trailer with the second horizontal frame removed to illustrate a top view of the first horizontal frame.

DETAILED DESCRIPTION OF THE DRAWINGS

Figure 1:
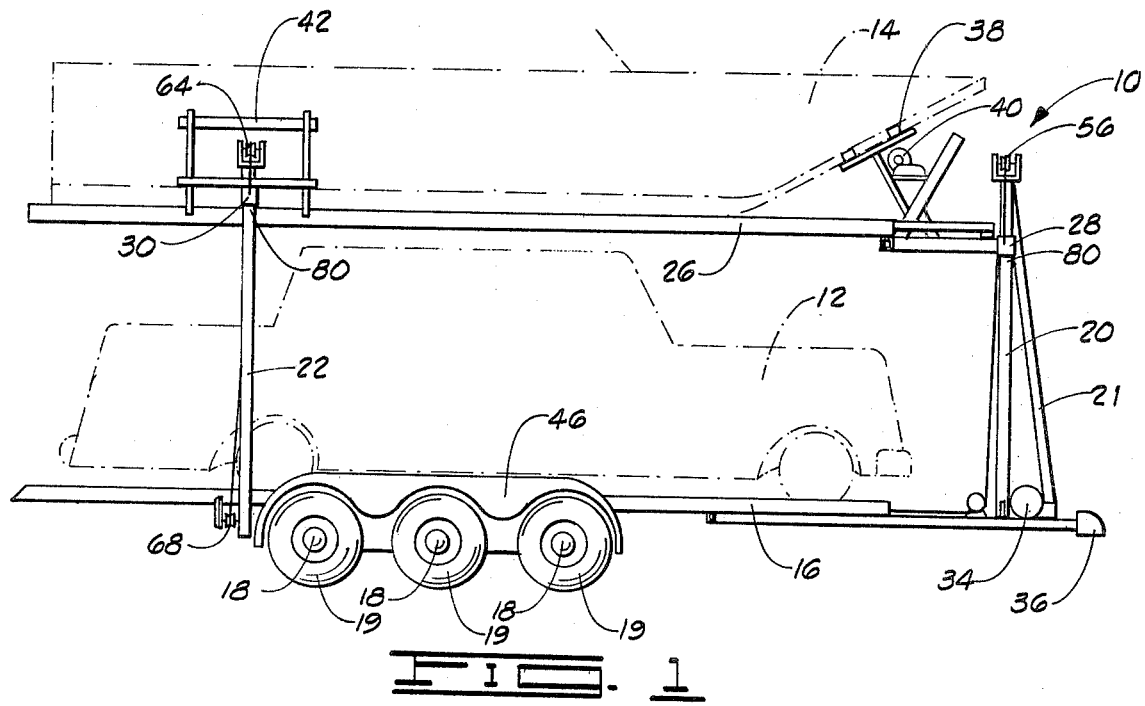
FIG. 1 is a side view of the trailer with the boat and automobile shown in dotted lines ready for transporting behind a towing vehicle.

In FIG. 1 a side view of the combination boat and automobile trailer is shown and designated by general reference numeral 10. The trailer 10 is shown with an automobile 12 and boat 14 loaded thereon and shown in dotted lines.

The trailer 10 includes a first horizontal frame 16 mounted on a wheeled axle 18. In this figure the frame 16 includes more than one axle 18 having tires 19 mounted thereon.

A first vertical post 20 having a post support 21 is attached to the front of the first frame 16. Mounted at the rear of the frame 16 and on opposite sides is a second post 22 and a third post 24. The third post 24 can be seen in FIG. 5. A second horizontal frame 26 is slidably mounted on the posts 20, 22 and 24 by a first sleeve 28, a second sleeve 30 and a third sleeve 32. The third sleeve 32 can be seen in FIG. 5. The second and third posts 22 and 24 are supported by post supports 33 shown in FIG. 5.

The second horizontal frame 26 is raised and lowered on the posts 20, 22 and 24 through the use of a winch and cable system having a winch 34 connected to a plurality of cables which will be described in detail under FIG. 6.

Figure 2:
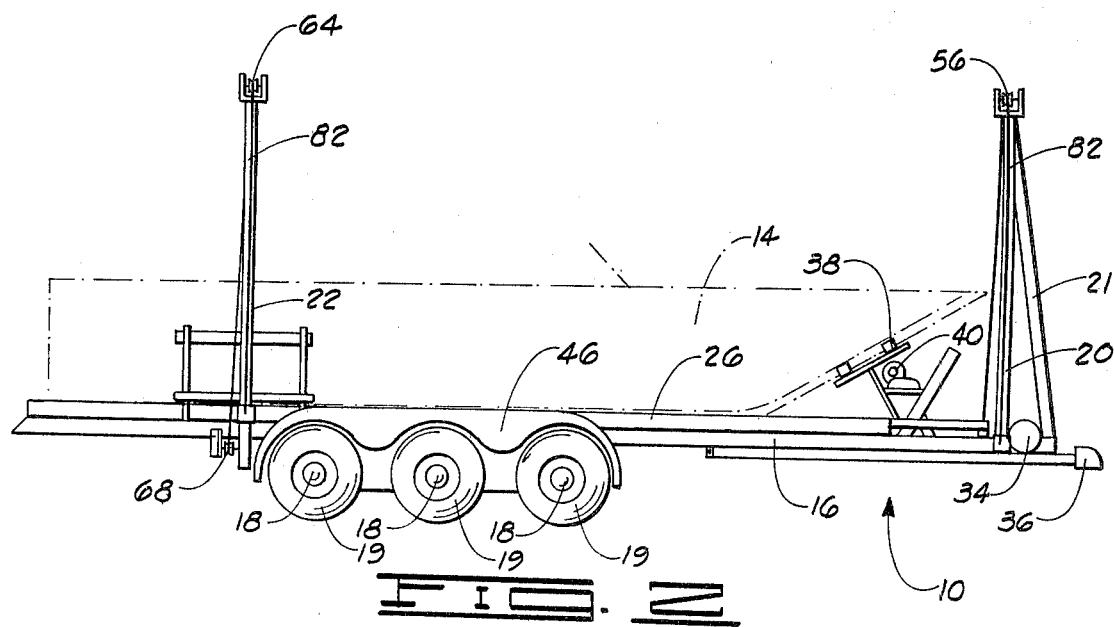
FIG. 2 is a side view of the trailer with the automobile unloaded and the second frame lowered with the boat thereon.

The trailer 10 further includes a trailer hitch 36 which is used for releasable attachment to a towing vehicle. The towing vehicle is not shown in the drawings. The automobile 12 can be unloaded from the trailer 10 and connected to the trailer 10 for unloading the boat 14 into the water. As shown in FIG. 2 the automobile 12 has been unloaded and by using the power winch and cable system the second horizontal frame 26 has been lowered in a horizontal plane to a position where the second frame 26 rests on top of the first frame 16. The trailer 10 can now be backed into the water for unloading the boat 14.

The second horizontal frame 26 further includes a bow support 38 with a hand winch 40 attached to the front of the second frame 26. The winch 40 is used for securing the boat 14 against the bow support 38 and releasing the boat 14 when it is unloaded. The second frame 26 also includes boat guides 42 for aiding in loading and unloading the boat 14 on the second frame 26. In FIG. 3 boat guide supports 44 can be seen which are mounted along the length of the second frame 26 for receiving the boat thereon and centering the boat 14 on top of the frame 26.

In FIG. 4 the second frame 26 has been removed for exposing the top of the first frame 16. The first frame 16 can be seen having a pair of fenders 46 mounted over the wheels 20 and a plurality of frame cross supports 48. Also seen in this view is a pair of tire guides 50 mounted on the opposite sides of the frame 16 and along the length thereof for receiving the tires of the automobile 12 when it is loaded thereon.

Figure 5:
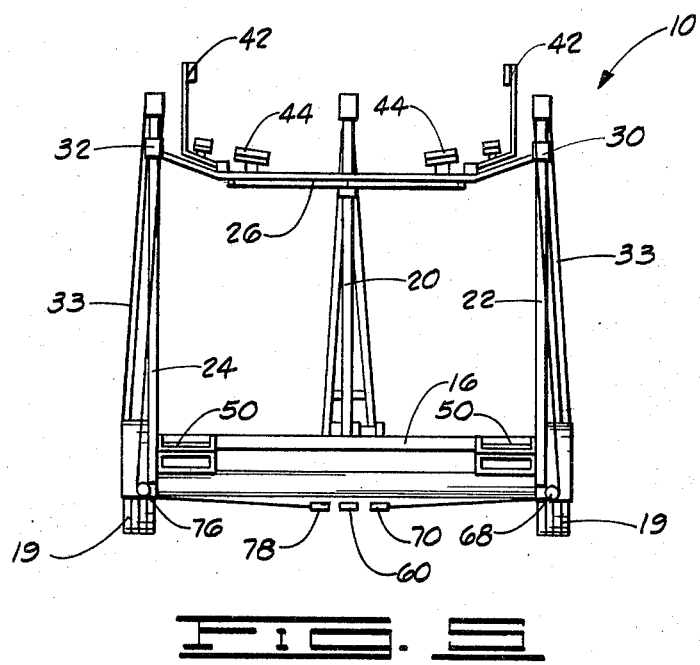
FIG. 5 is a rear view of the trailer with the boat and automobile unloaded.

In FIG. 5 a rear view of the trailer 10 can be seen with both the automobile 12 and boat 14 removed. In this figure the second frame 26 can be seen raised in a fully extended position above the first frame 16.

Figure 6:
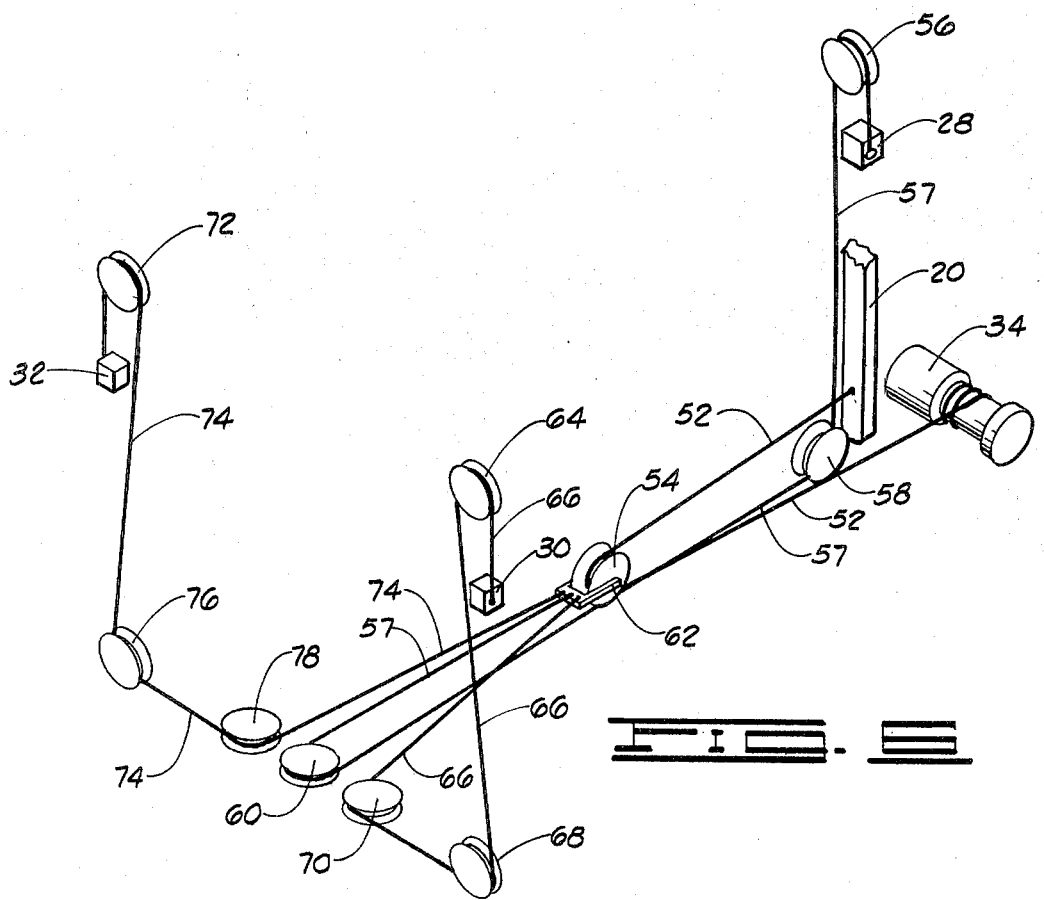
FIG. 6 is a schematic representing the cable and winch system of the trailer.

In FIG. 6 the winch and cable system is shown removed from the trailer 10 to more clearly illustrate how the second horizontal frame 26 is raised and lowered above the first horizontal frame 16.

The power winch 34 is connected to a main cable 52 which is received around a main pulley 54 with the other end of the main cable 52 attached to the first post 20. The main pulley 54 is suspended underneath the first frame 16 and between the front and rear of the frame 16. A first post pulley 56 is mounted on top of the first post 20 and can be seen in FIGS. 1 and 2. One end of a first post cable 57 is attached to the first sleeve 28 with the first post cable 57 received around the first post pulley 56 then around a first frame pulley 58 which is mounted on the front of the frame 16. The first post cable 57 is then received around a first idle pulley 60 mounted at the rear of the first frame 16 and shown in FIG. 5. The first post cable 57 is then attached to a main pulley block 62 attached to the main pulley 54.

A second post pulley 64 is mounted on top of the second post 22 and shown in FIGS. 1 and 2. A second post cable 66 is attached to the second sleeve 30 and received around the second post pulley 64 and then around a second frame pulley 68 mounted on the rear of the frame 16 and shown in FIG. 5. The second post cable 66 is then received around a second idle pulley 70 and then the opposite end of the cable 66 is attached to the main pulley block 62.

A third post pulley 72 is mounted on top of the third post 24 and can be seen in FIG. 3. One end of a third post cable 74 is attached to the third sleeve 32. The third post cable 74 is then received around a third frame pulley 76 mounted on the rear of the frame 16 and shown in FIG. 5. The third post cable 74 is then received around a third idle pulley 78 shown in FIG. 5 and then the opposite end of the cable 74 is attached to the main pulley block 62.

When the main cable 52 is unwound from the power winch 34 the main pulley 54 moves toward the rear of the first frame 16 and the first post cable 57, second post cable 66 and third post cable 74 allow the sleeves 28, 30 and 32 to slide downward on the posts 20, 22 and 24 thereby lowering the second frame 26 on top of the first frame 16 as shown in FIG. 2. When the boat 14 has been unloaded and then loaded again on the frame 26 and it is desired to load the automobile 12 on the trailer 10, the second frame 26 is raised on the posts 20, 22 and 24 by reversing the direction of the power winch 34 and winding the main cable 52 thereon. At this time, the main pulley 62 moves forward toward the front of the first frame 16 with the first post cable 57, second post cable 66 and third post cable 74 raising the sleeves 28, 30 and 32 on the posts until the second frame 26 is in a raised position.

It should be noted in FIG. 1 and FIG. 2 the second frame 26 is secured in place by safety pins 80 received in holes 82 in the top of the posts 20, 22 and 24. This prevents the second frame 26 from inadvertently lowering onto the top of the automobile 12 or the first frame 16 should the cable system accidentally be released. It can be appreciated when it is desired to lower the second frame 26 before activating the power winch 34, the pins 80 are removed from the holes 82.

Changes may be made in the construction and arrangement of the parts or elements of the embodiments as described herein without departing from the spirit or scope of the invention defined in the following claims.

What is claimed is:

1. A double load trailer for hauling both an automobile, a boat or the like behind a towing vehicle, the trailer comprising:
   - a first horizontal frame mounted on a wheeled axle and adapted for releasable attachment to the towing vehicle;
   - a first vertical post mounted on the front of the first frame;
   - second and third vertical posts mounted on the opposite sides of the rear of the first frame;
   - a second horizontal frame disposed above the first frame, the second frame having a first sleeve attached to the front of the second frame and a second and third sleeve attached to the opposite sides of the rear of the second frame, the sleeves slidably received around the posts;
   - a power winch mounted on the front of the first frame and having a main cable received around a main pulley and attached to the first post, the main pulley suspended between the front and rear of the first frame;
   - a first post cable having one end attached to the first sleeve and received around a first post pulley mounted on top of the first post, the first post cable received around a first frame pulley attached to the front of the first frame, the first post cable also received around a first idle pulley attached to the rear of the first frame with the other end of the first post cable attached to the main pulley;
   - a second post cable having one end attached to the second sleeve and received around a second post pulley mounted on top of the second post, the second post cable received around a second frame pulley attached to one side of the rear of the first frame, the second post cable received around a second idle pulley attached to the rear of the first frame with the other end of the second post cable attached to the main pulley; and
   - a third post cable having one end attached to the third sleeve and received around a third post pulley mounted on top of the third post, the third post cable received around a third frame pulley attached to the other side of the rear of the first frame, the third post cable received around a third idle pulley attached to the rear of the first frame with the other end of the third post cable attached to the main pulley.

2. The trailer as described in claim 1 wherein the first frame includes a pair of tire guides mounted on the opposite sides of the frame and along the length thereof, the guides adapted for receiving the tires of an automobile thereon.

3. The trailer as described in claim 1 wherein the second frame includes boat guides and supports mounted on the opposite sides of the second frame and along the length thereof and adapted for receiving the boat thereon.

4. The trailer as described in claim 3 wherein the second frame further includes a bow support with hand winch attached to the front of the second frame for securing the bow of the boat against the bow support.

* * * * *